United States Patent [19]
Lehmkuhl

[11] Patent Number: 5,538,312
[45] Date of Patent: Jul. 23, 1996

[54] AUTOMOTIVE SLIDING DOOR AND FUEL CAP LOCKOUT MECHANISM

[75] Inventor: David B. Lehmkuhl, Northville, Mich.

[73] Assignee: Ford Motor Company, Dearborn, Mich.

[21] Appl. No.: 368,946

[22] Filed: Jan. 5, 1995

[51] Int. Cl.⁶ .................................................. B62D 25/00
[52] U.S. Cl. .............. 296/97.22; 296/155; 292/DIG. 46; 280/893
[58] Field of Search ................................ 296/155, 97.22; 49/68; 292/DIG. 46; 280/853

[56] References Cited

U.S. PATENT DOCUMENTS

| | | |
|---|---|---|
| 4,620,744 | 11/1986 | Yui et al. . |
| 5,454,618 | 10/1995 | Sullivan ................. 296/97.22 |

FOREIGN PATENT DOCUMENTS

| | | |
|---|---|---|
| 2568523 | 8/1984 | France . |
| 56-28019 | 3/1981 | Japan . |
| 59-11918 | 1/1984 | Japan . |

*Primary Examiner*—Gary C. Hoge
*Attorney, Agent, or Firm*—David B. Kelley; Roger L. May

[57] ABSTRACT

An interlock mechanism is mounted proximate a door track for a vehicle having a sliding door and a fuel filler door on the same side of the vehicle. The mechanism has a pair of interacting links which prevent either door from opening when the other is already open. A first link is connected to the filler door and obstructs movement of a second link in the door track, and thus the sliding door, when the filler door is open. When the sliding door is open, the second link obstructs movement of the first link which in turn prevents the filler door from opening.

18 Claims, 4 Drawing Sheets

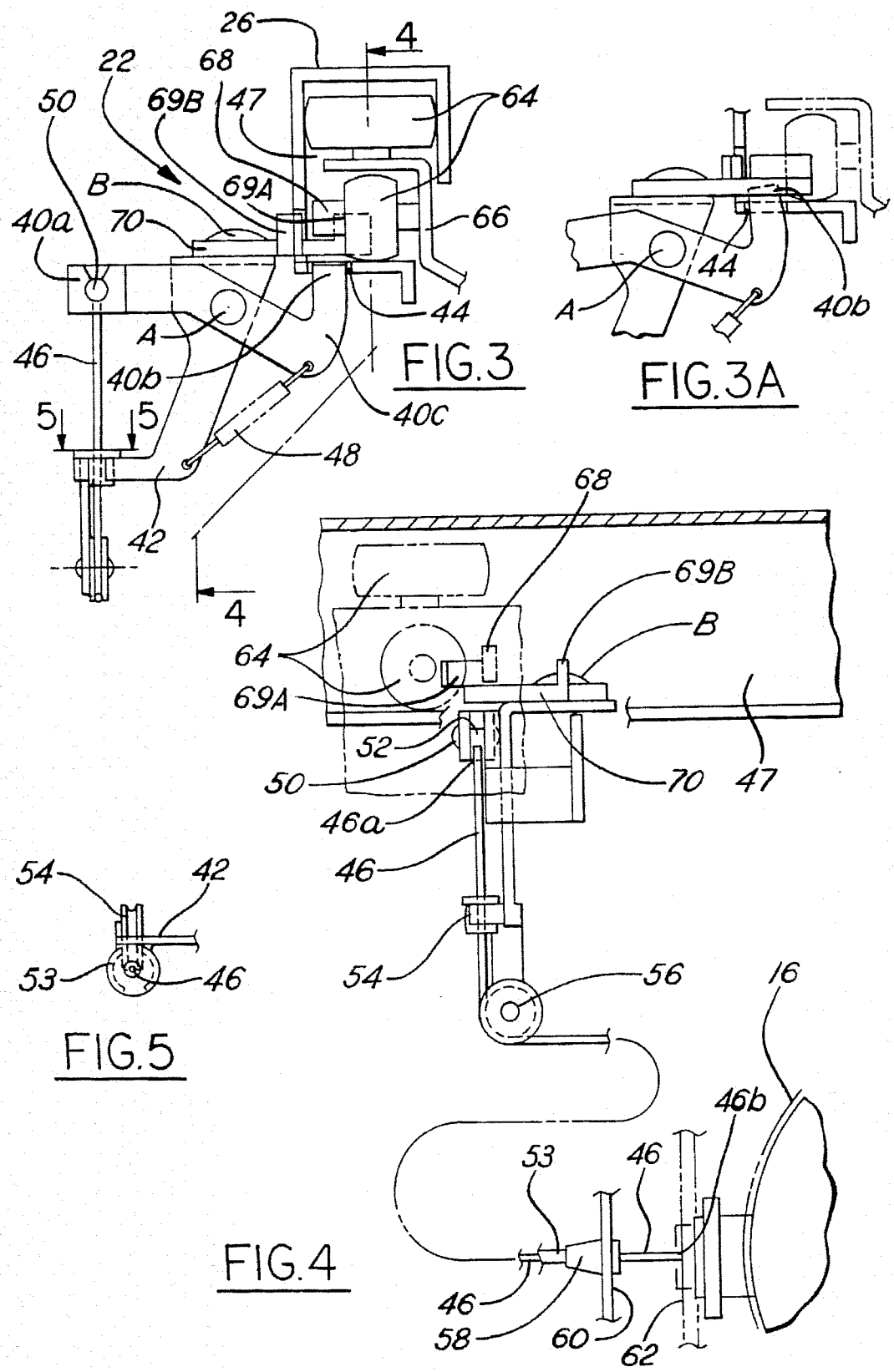

AUTOMOTIVE SLIDING DOOR AND FUEL CAP LOCKOUT MECHANISM

FIELD OF THE INVENTION

The present invention relates mechanisms for stopping a vehicle sliding door, and, more particularly, to a lockout mechanism for preventing an automotive vehicle sliding door from colliding with a fuel filler door.

BACKGROUND OF THE INVENTION

Sliding doors are commonly used on vans and other vehicles for allowing entry and egress of passengers, parcels and other items to be hauled or transported. Sliding doors are desirable because they permit wider access to a vehicle entrance space than a conventional hinge mounted door, and, perhaps more importantly, they do not extend nearly as far into an area around the vehicle thus decreasing the number and severity of door induced dents and dings in adjacent vehicles.

An automotive vehicle sliding door typically has two or three sets of rollers mounted within corresponding longitudinally oriented tracks. For example, an upper track is located above the sliding door entrance way, a center track is located between the rear quarter panel and the inside rear trim panel, and a lower track is situated below the entrance way. As the door is unlatched and pushed rearward, it is routed by the tracks slightly outward of the vehicle exterior and slides adjacent to the rear quarter panel.

Conventional vehicle design practice is to place the sliding door on the side of the vehicle opposite the driver's side, and to locate a filler pipe access lid on the driver's side rear quarter panel. Such a design avoids a collision between the sliding door and the filler pipe access lid if the access lid is open for refueling and the sliding door is subsequently opened.

Some vehicles, however, may have the sliding door and the access lid on the same side of the vehicle, or may have sliding doors on both sides of the vehicle. In either case, the potentiality exists for the aforementioned collision between the sliding door and the access lid.

A device utilizing a door track obstruction was shown in U.S. Pat. No. 5,454,618, assigned to the assignee of the present invention and incorporated herein by reference. In that application, a stop member mounted proximate a door track has a first, obstructing position projecting into an inner portion of the track so as to obstruct movement of the sliding door along the track and a second, retracted position withdrawn from obstructing the track. The position of the door stop is actuated by the fuel filler door so that when the fuel filler access lid is opened, the stop member is moved to the obstructing position to prevent collision of the sliding door with the access lid. When the fuel filler access lid is closed, the stop moves to the retracted position so as not to obstruct movement of the sliding door within the door track. Such a device makes no provision, however, for preventing a collision between the filler door and the sliding door after the sliding door has been opened. In addition, there is no provision for locking out the filler door under any circumstance.

SUMMARY OF THE INVENTION

Responsive to the aforementioned deficiencies in the related art, the present invention provides a door interlock mechanism for a vehicle having a sliding door and a fuel filler door which permits only one of the doors to open at any given time. The mechanism comprises interlock means mounted proximate a door track for the sliding door which is actuated by the position of either the sliding door or the filler door. The interlock means has a first position in which the sliding door and the filler door are closed and in which the interlock means permits only one of the sliding door and the filler door to open, a second position in which the filler door is open and the interlock means is actuated by the filler door to prevent movement of the sliding door in the door track, and a third position in which the sliding door is open and the interlock means is actuated by movement of the sliding door to prevent the filler door from opening.

In a preferred embodiment, the mechanism has a filler door link and a door track link which interact to prevent the abovedescribed collisions. The filler door link is actuated by the filler door between a position retracted from an inner portion of the door track when the interlock means is in the first position, and a position projecting into the inner portion of the door track when the interlock means is in the second position. A door track link is actuated by the sliding door between a position not blocking movement of the filler door link into the inner portion of the door track when the interlock means is in the first position, and a position blocking the filler door link from projecting into the inner portion of the door track when the interlock means is in the third position.

As such, one advantage of the present invention is a robust lock-out mechanism for a vehicle sliding door and fuel filler cap which prevents opening of the filler cap when the sliding door is in an open position.

Another advantage is a sliding door lock-out mechanism which can be inexpensively manufactured and easily assembled.

Yet another advantage of the present invention is that even a slight movement of either the filler door or the sliding door immediately prevents movement of the other.

Still another advantage of the present invention is that the sliding door lock-out mechanism is hidden from exterior view.

Another advantage is that the lock-out mechanism is installed in the center sliding door track thus making installation easier than devices mounted on the lower track which require workers to bend over.

A feature of the present invention is a sliding door lock-out mechanism mounted near the sliding door center track having a filler door link actuated by the filler door and a door track link actuated by the sliding door so that when either door is opened its associated link interacts with the other link to prevent the other door from opening.

BRIEF DESCRIPTION OF THE DRAWINGS

These and other objects, advantages and features of the present invention will be apparent to those skilled in the automotive body arts upon reading the following description with reference to the accompanying drawings, in which:

FIG. 3 is an end view of a door track having a sliding door lock-out mechanism according to a first embodiment of the present invention;

FIG. 3A is a view similar to FIG. 3 but showing the fuel filler door link in a blocking position;

FIG. 4 is a schematic side view of a lock-out mechanism according to the present invention taken along line 4—4 of FIG. 3;

FIG. 5 is a top view of a fuel filler door link actuating cable taken along line 5—5 of FIG. 3;

DETAILED DESCRIPTION OF THE PREFERRED EMBODIMENT

Figure 1:
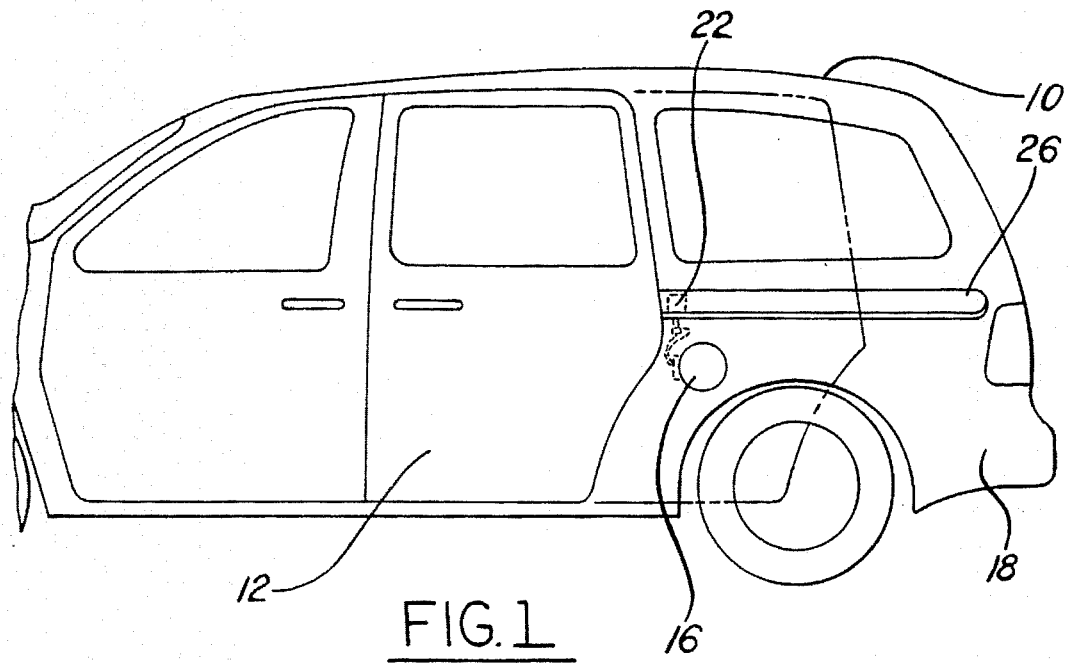
FIG. 1 is a side view of a vehicle body having a sliding door and a fuel filler access lid on the same side of the vehicle body.
Figure 2:
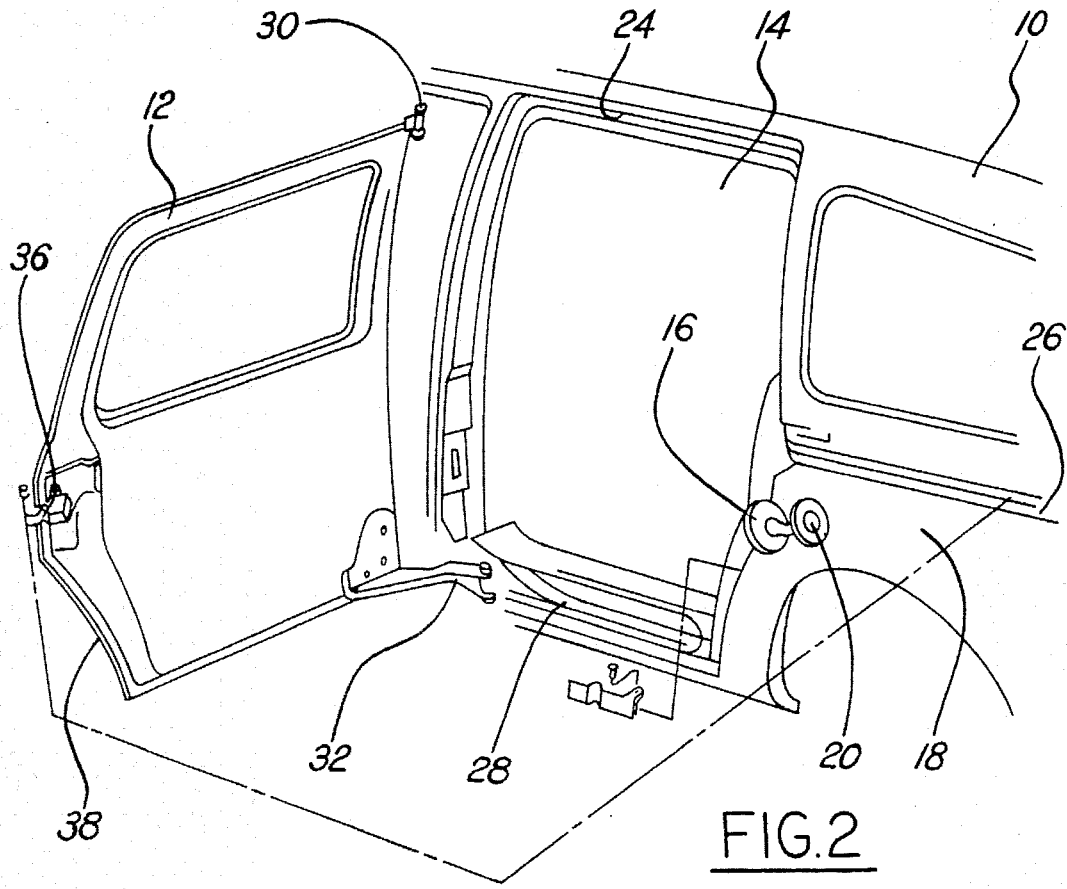
FIG. 2 is a perspective side view of a vehicle entrance way and an adjacent rearward vehicle body section showing the relative locations of a sliding door, the sliding door tracks, and the fuel filler access lid.

Referring now to FIGS. 1 and 2, a vehicle body 10, for example in a van, has a sliding door 12 along a side thereof for alternately covering and uncovering a passage way 14 (FIG. 2) to allow entry and egress therefrom. A fuel filler door 16 on a rear quarter panel 18 of the body 10 allows access to the filler pipe 20 during refueling. If the filler door 16 is opened for refueling and door 12 is slid open to uncover passage way 14, a collision will occur unless filler door 16 is shut or door 12 is stopped (FIG. 1). Since a fuel pump filler nozzle (not shown) may be in filler pipe 20 when door 12 is opened, it is impractical to shut filler door 16 in such a situation. In addition, if the filler door 16 is opened while the sliding door 12 is open, a collision between the two doors may occur when the sliding door 12 is subsequently shut. The present invention, therefore, provides a lock-out mechanism 22 which precludes opening of either the filler door 16 or the sliding door 12 when the other is open so as to prevent the potentiality of the abovedescribed collisions.

Before more fully describing the present invention, a brief description of the sliding door 12 structure will be useful in understanding operation of the lockout mechanism 22. As seen in FIG. 2, an automotive sliding door 12 typically has an upper track 24 located above passage way 14, a center track 26 located on rear quarter panel 18, and a lower track 28 situated below passage way 14. Rollers 30 and 32 are mounted on door 12 at upper and lower areas of forward section 34, respectively, to guide door 12 along corresponding longitudinally oriented tracks 24 and 28, respectively. Door 12 also has a set of rollers 36 mounted at a rear section 38 which slidingly engage with center track 26. As door 12 is unlatched and pushed rearward, it is routed by rollers 30, 32 and 36 within tracks 24, 26 and 28, respectively, slightly outward of vehicle body 10 exterior and slides adjacent to rear quarter panel 18. Thus, lockout mechanism 22 is provided to stop sliding door 12 in its tracks 24, 26, and 28 before colliding with fuel filler access lid 16.

A preferred embodiment of the present invention will now be described with reference to FIGS. 3–9. As seen in FIG. 3, mechanism 22 has a filler door link 40 pivotally mounted at pivot point A to a bracket 42 below an opening 44 in center door track 26. Bracket 42 is preferably mounted on an interior side of quarter panel 18. Door link 40 is connected at a first end 40a to a cable 46 and has a second end 40b which rotates into an inner portion 47 of door track 26 when filler door 16 is opened, as is further described below. Preferably, door link 40 is a solid piece with a hook shaped portion 40c between pivot point A and end 40b. A spring 48 is connected at one end to portion 40c of door link 40 and on the other end to bracket 42 so as to bias door link to the retracted position of FIG. 3 with end 40b retracted from the inner portion 47 of the door track 26. When door link 40 is rotated counterclockwise about pivot point A by the force of cable 46 on end 40a, end 40b moves into a position projecting through opening 44 into the inner portion 47 of center track 26 (FIG. 3A) so as to interact with a door track link 70 and obstruct movement of roller assembly 64 along center track 26 as further discussed below.

Movement of door link 40 between the retracted position (FIG. 3) and the obstructing position (FIG. 3A) is accomplished by connection to filler door 16 through cable 46, as best seen in FIG. 4. Cable 46 has first end 46a with a bead 50 thereon for rotatable movement with filler door link 40 in a manner known to those skilled in the art and suggested by this disclosure. A U-shaped section 52 is provided on end 40a of door link 40 to accommodate movement of cable 46 as door link 40 rotates between the retracted and obstructing positions (FIGS. 3 and 3A).

Referring to FIGS. 3–5, cable 46 has a sheath 53 therearound which passes through a sheath brace 54 fixed to bracket 42. Cable 46 is preferably routed around a pulley 56, or a similar cable tightening device known in the art, to maintain proper tension thereon. Sheath 53 is connected to a grommet 58 at stanchion plate 60 through which cable 46 passes. A second end 46b of cable 46 is attached to filler door 16 on an interior surface 62 thereof (FIG. 4). Preferably, a cable take-up section (not shown), such as that shown in previously mentioned U.S. Pat. No. 5,454,618, receives the second end 46b of cable 46 to allow filler door 16 to open a predetermined distance before pulling on cable 46 to activate filler door link 40 to the obstructing position of FIG. 3. Such a feature permits proper operation if filler door 16 has greater rotational movement than necessary to rotate door link 40 between the retracted and obstructing positions.

As seen in FIGS. 3–4, a roller assembly 64 fixed to a sliding door bracket 66 is mounted within the inner portion 47 of center track 26 to allow movement of sliding door 12 therealong. A rod 68 attached to assembly 64 interacts with a pair of upstanding tabs 69a and 69b on a door track link 70 to prevent filler door link 40 from entering inner portion 47 when the sliding door 12 is open, as further described below. Door track link 70 is pivotally mounted at point B to an upper end of bracket 42 so as to partially extend through an aperture 72 in a side 74 of center door track 26 (FIGS. 4 and 6).

Figure 6:
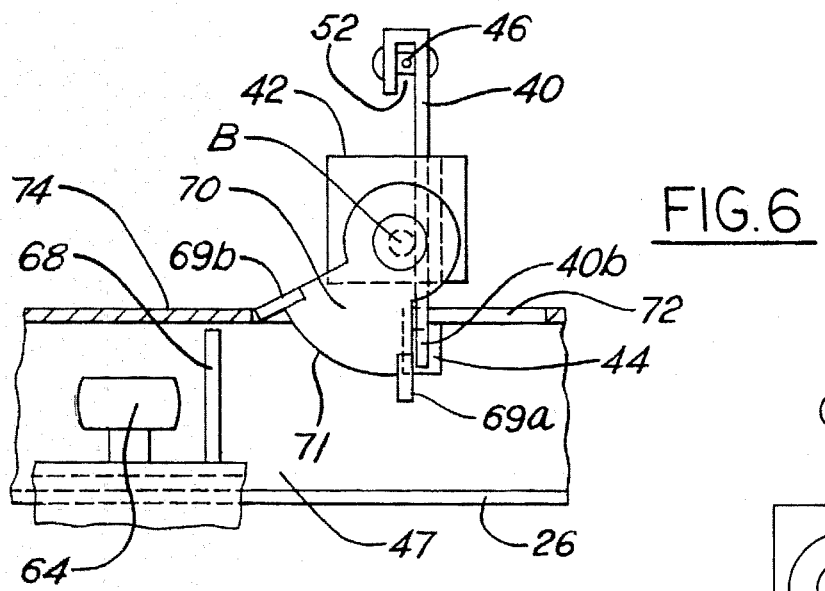
FIG. 6 is a top view of the lock-out mechanism of FIG. 3 showing the positions of the sliding door roller and door track link when the sliding door is in the closed position.

Operation of the sliding door lock-out mechanism 22 is best seen in FIGS. 6–9. In FIG. 6, sliding door 12 is closed and the roller assembly 64 is in a position which does not interact with the lock-out mechanism 22. The door track link 70, which preferably is pie shaped with an arcuate edge 71, has an upstanding tab 69a extending partially into inner portion 47 of the center track 26 on one extreme of edge 71. On the other extreme of edge 71 is an upstanding tab 69b which is situated in aperture 72.

In this position, the door track link 70 does not obstruct movement of the filler door link 40 into opening 44 (FIG. 3A). Thus, the filler door 16 may open and close with filler door link 40 moving between the obstructing and retracted positions, as in FIGS. 3A and 3, respectively. When filler door 16 is open and filler door link is in the obstructing position of FIG. 3A, door track link 70 is prevented from rotating about point B. Therefore, when sliding door 12 is opened a short distance so that rod 68 of roller assembly 64 contacts tab 69a (FIG. 7), door track link 70 is prevented from rotating and sliding door 12 is stopped in its track. Thus, the interlock mechanism 22 prevents sliding door 16 from opening when the filler door 16 is open and the potential for a collision between the two doors is eliminated.

Figure 7:
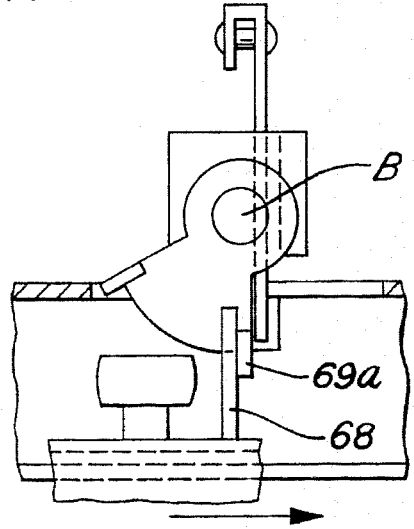
FIG. 7 is a top view similar to FIG. 6 but shown when the sliding door is opened and the sliding door roller contacts and rotates the door track link so as to obstruct movement of the fuel filler door link.

However, when the filler door 16 is closed, the filler door link 40 is in the retracted position of FIG. 3. In that position, door track link 70 can rotate about point B when the rod 68 contacts the upstanding tab 69a (FIG. 7). Since there is no interference from the interlock mechanism 22, the sliding door 12 may freely roll open. As the roller assembly 64 moves in the center track 26, the door track link 70 is rotated to a position blocking opening 44 (FIG. 8) with upstanding tab 69b extending into the inner portion 47. In that position, with the sliding door 12 open, the filler door is prevented from opening since the filler door link 40 is blocked by the door track link 70. Thus, the filler door 16 cannot open when the sliding door 16 is open and damage which may occur otherwise is avoided.

Figure 8:
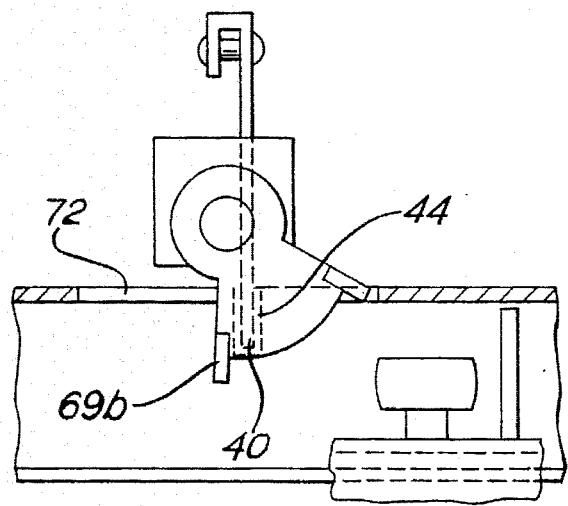
FIG. 8 is a top view similar to FIGS. 6 and 7 but showing the sliding door roller after moving past the lockout mechanism with the door track link rotated to lock-out the fuel filler door link.
Figure 9:
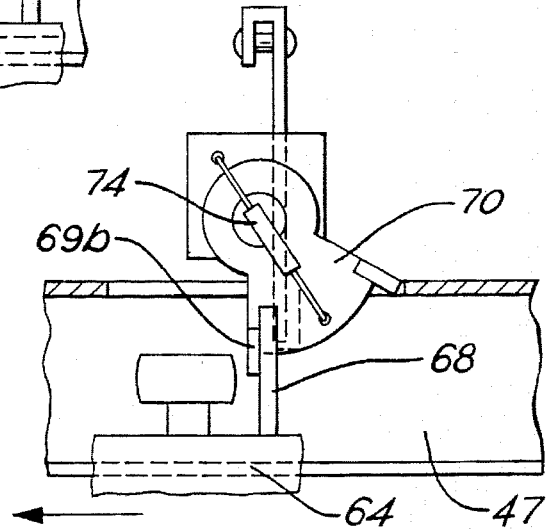
FIG. 9 is a top view similar to FIGS. 6–8 but showing the sliding door roller moving toward the closed position rotating the door track link in a direction to unobstruct movement of the fuel filler door link.

As the sliding door 12 is moved from the open position of FIG. 8 to the closed position, the rod 68 contacts the upstanding tab 69b, as seen in FIG. 9 and moves it to the unblocking position of FIG. 6. In that position, either door may be opened as just described.

Preferably, door track link 70 has an over-center spring 74 mounted thereon which biases link 70 to either the unblocking position (FIG. 6) or the blocking position (FIG. 8). For the sake of clarity, the over-center spring is shown only in FIG. 9, but it will be understood that such a spring would likewise appear in FIGS. 6–8. The over-center spring 74 prevents link 70 from stopping in an intermediate position between those two positions. Other biasing means known to those skilled in the art and suggested by this disclosure may also be used.

It should be noted that one advantage of the interlock mechanism 22 is that even a slight movement of either filler door link 40 or the door track link 70 immediately prevents movement of the other link so as to lock-out the door associated therewith. This result occurs regardless of the action of the over-center spring 74 on door track link 70.

Figure 10:
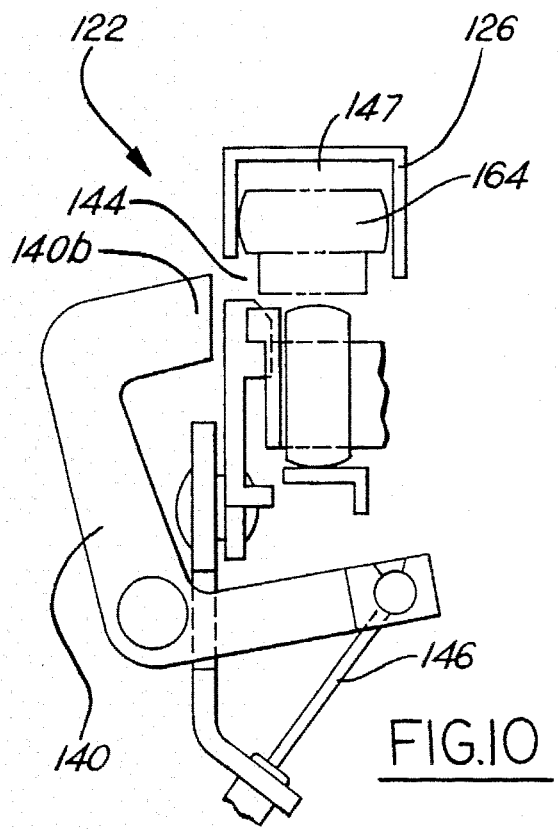
FIG. 10 is an end view of a second embodiment of a sliding door lock-out mechanism according to the present invention.
Figure 11:
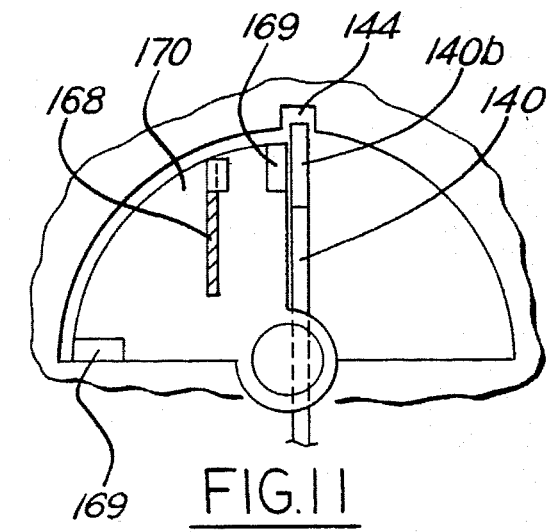
FIG. 11 is a side view of the lock-out mechanism shown in FIG. 10.

As seen in FIGS. 10–13, other arrangements of the interlock mechanism 22 may be used. In FIGS. 10–11, like parts of the interlock mechanism 122 have like reference numerals increased by one hundred (100). As seen in FIG 10, the filler door link 140 is mounted so as to enter door track 126 through a side opening 144 upon being actuated by cable 146. The door track link 170 is mounted in the inner portion 147 to block and unblock opening 144 in a manner similar to that described above with reference to interlock mechanism 22, and rod 168 of roller assembly 164 interacts with upstanding tabs 169 in a similar fashion. It should be noted that in both interlock mechanisms 22 and 122, the door track links 40, 140, respectively, pivot in a plane perpendicular to the plane of rotation of the door track links 70, 170, respectively.

Figure 12:
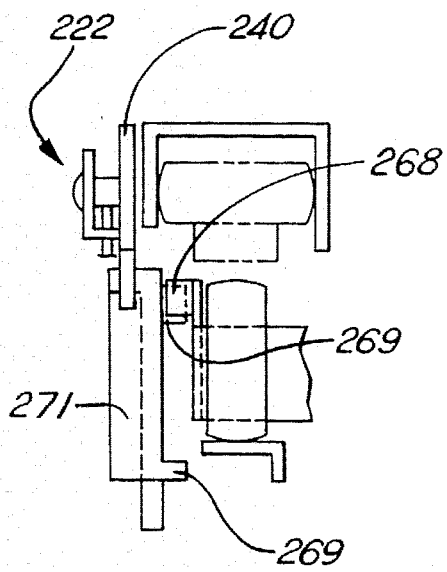
FIG. 12 is an end view of a third embodiment of a sliding door lock-out mechanism according to the present invention.
Figure 13:
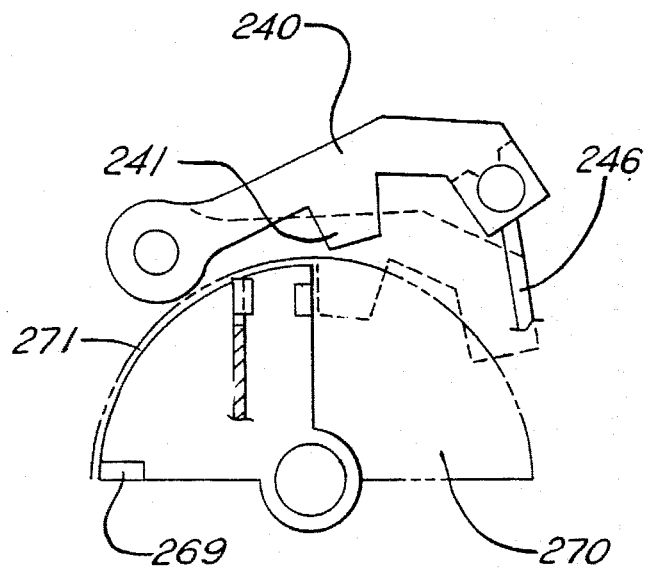
FIG. 13 is a side view of the lock-out mechanism shown in FIG. 12.

In the interlock mechanism 222 of FIGS. 12–13, the filler door link 240 is mounted so as to pivot in a plane parallel to the plane of rotation of the door track link 270. Like parts of the interlock mechanism 222 have like reference numerals increased by one hundred (200). As best seen in FIG. 13, the filler door link 240 has a nob 241 extending therefrom toward door track link 270. When cable 46 rotates filler door link 240 to the position shown in phantom in FIG. 13, the door track link 270 is locked out and the sliding door cannot open. However, when the sliding door is open, the door track link 270 rotates to obstruct movement of filler door link 240 theretoward and thus prevent the filler door from being opened. As seen in FIG. 12, the door track link 270 has a flange 271 on an opposite side of upstanding tabs 269 which interacts with nob 241.

Although the preferred embodiment of the present invention has been disclosed, various changes and modifications may be made without departing from the scope of the invention as set forth in the appended claims.

I claim:

1. A door interlock mechanism for a vehicle having a sliding door and a fuel filler door, the mechanism comprising interlock means mounted proximate a door track for said sliding door and actuated by the position of said sliding door and said filler door, said interlock means having:

a first position in which said sliding door and said filler door are closed and in which said interlock means permits only one of said sliding door and said filler door to open;

a second position in which said filler door is open and said interlock means is actuated by said filler door to prevent movement of said sliding door in said door track; and a third position in which said sliding door is open and said interlock means is actuated by movement of said sliding door to prevent said filler door from opening.

2. A door interlock mechanism as defined in claim 1 wherein said interlock means comprises:

a filler door link actuated by said filler door between a position retracted from an inner portion of said door track when said interlock means is in said first position, and a position projecting into said inner portion of said door track when said interlock means is in said second position, and;

a door track link actuated by said sliding door between a position not blocking movement of said filler door link into said inner portion of said door track when said interlock means is in said first position, and a position blocking said filler door link from projecting into said inner portion of said door track when said interlock means is in said third position.

3. A door interlock mechanism as defined in claim 2 wherein said filler door link is actuated through connection means comprising:

a cable with a first end connected to said filler door link and a second end connected to the interior of said filler door; and bias means attached to said filler door link for biasing said filler door link to a retracted position.

4. A door interlock mechanism according to claim 2 wherein said filler door link enters said inner portion through a bottom opening in said door track.

5. A door interlock mechanism according to claim 4 wherein said door track link is pivotally mounted to rotate so as to obstruct said bottom opening when said interlock mechanism is in said third position.

6. A door interlock mechanism according to claim 4 wherein said filler door link moves through said bottom opening into said inner portion of said door track to block rotation of said door track link when said interlock mechanism is in said second position.

7. A door interlock mechanism according to claim 2 wherein said door track link is pivotally mounted with a pair of tabs extending into said door track which interact with a portion of a sliding door roller assembly moving in said door track to actuate said interlock mechanism between said first and third positions.

8. A door interlock mechanism according to claim 2 wherein said door track link pivots in a plane perpendicular to the plane of rotation of said filler door link.

9. A door interlock mechanism for a vehicle having a fuel filler door and a sliding door mounted in a door track for slidable movement therein, the mechanism comprising:

a filler door link mounted proximate the door track and having connection means to the filler door, and a door track link mounted proximate the filler door link to interact therewith and so that movement of the sliding door actuates the door track link, the filler door link actuated by the connection means between a first position projecting into an inner portion of the track when the filler door is open so as to prevent movement of the door track link, and a second position retracted from the inner portion of the track when the filler door is closed to permit movement of the door track link, and the door track link actuated between an unblocking position permitting movement of the filler door link to the first position when the sliding door is closed, and a blocking position when the sliding door is opened to prevent the filler door link from moving to the first position.

10. A door interlock mechanism as defined in claim 9 wherein the connection means comprises a cable with a first end connected to the filler door link and a second end connected to the interior of the filler door.

11. A door interlock mechanism according to claim 10 wherein the door track link is pivotally mounted and rotates to obstruct a bottom opening in the door track when the sliding door is open, and wherein the filler door link enters the inner portion through the bottom opening to block rotation of the door track link when the filler door is open.

12. A door interlock mechanism according to claim 11 wherein the door track link has a pair of tabs extending into the door track which interact with a rod on a sliding door roller assembly moving in the door track so as to actuate the door track link between the blocking and unblocking positions.

13. A door interlock mechanism according to claim 12 wherein the door track link pivots in a plane perpendicular to the plane of rotation of the filler door link.

14. A door interlock mechanism according to claim 12 wherein the door track link is biased to the blocking and unblocking positions by an over-center spring attached thereto.

15. A door interlock mechanism for a vehicle having a fuel filler door and a sliding door mounted in a door track for slidable movement therein, the mechanism comprising:

a filler door link mounted to the interior of a rear quarter panel of the vehicle proximate an opening in the door track, the filler door link having a first position projecting through the opening into an inner portion of the track, and a second position retracted from the inner portion of the track;

a cable with a first end connected to the filler door link and a second end connected to the interior of the filler door;

a spring attached to the filler door link for biasing the filler door link such that when the filler door is opened the cable pulls the filler door link against the force of the spring so that the filler door link moves to the first position, and when the filler door is closed the spring biases the filler door link to the second position; and a door track link mounted proximate the filler door link and having an unblocking position permitting movement of the filler door link to the first position when the sliding door is closed so that the filler door may be opened, the door track link actuated to a blocking position when the sliding door is opened to prevent the filler door link from moving to the first position thus preventing the filler door from being opened.

16. A door interlock mechanism according to claim 15 wherein the door track link is pivotally mounted and rotates to obstruct the opening in the door track when the sliding door is open, and wherein the filler door link enters the inner portion through the opening to block rotation of the door track link when the filler door is open.

17. A door interlock mechanism according to claim 16 wherein the door track link has a pair of tabs extending into the door track which interact with a protrusion on a sliding door roller assembly moving in the door track so as to actuate the door track link between the blocking and unblocking positions.

18. A door interlock mechanism according to claim 17 wherein the door track link is biased to the blocking and unblocking positions by an over-center spring attached thereto.

\* \* \* \* \*